United States Patent
Maeba et al.

(10) Patent No.: US 9,815,971 B2
(45) Date of Patent: Nov. 14, 2017

(54) HEAVY CALCIUM CARBONATE, PRODUCTION METHOD THEREFOR, AND RESIN COMPOSITION CONTAINING SAID CALCIUM CARBONATE

(71) Applicant: MARUO CALCIUM CO., LTD., Akashi-shi (JP)

(72) Inventors: Takeshi Maeba, Akashi (JP); Shoji Ehara, Akashi (JP); Hisakazu Hojo, Akashi (JP)

(73) Assignee: MARUO CALCIUM CO., LTD., Akashi-shi (JP)

( * ) Notice: Subject to any disclaimer, the term of this patent is extended or adjusted under 35 U.S.C. 154(b) by 21 days.

(21) Appl. No.: 14/412,514

(22) PCT Filed: Jul. 17, 2013

(86) PCT No.: PCT/JP2013/069379
§ 371 (c)(1),
(2) Date: Jan. 2, 2015

(87) PCT Pub. No.: WO2014/014011
PCT Pub. Date: Jan. 23, 2014

(65) Prior Publication Data
US 2015/0183963 A1    Jul. 2, 2015

(30) Foreign Application Priority Data

Jul. 18, 2012 (JP) ................................. 2012-159354
Jul. 18, 2012 (JP) ................................. 2012-159355

(51) Int. Cl.
| | | |
|---|---|---|
| C08K 9/04 | (2006.01) | |
| C09C 1/02 | (2006.01) | |
| C09J 11/04 | (2006.01) | |
| C01F 11/18 | (2006.01) | |
| B05D 3/02 | (2006.01) | |
| C08K 3/26 | (2006.01) | |

(52) U.S. Cl.
CPC ................ *C08K 9/04* (2013.01); *B05D 3/029* (2013.01); *C01F 11/18* (2013.01); *C01F 11/185* (2013.01); *C09C 1/021* (2013.01); *C09J 11/04* (2013.01); *C01P 2004/51* (2013.01); *C01P 2004/61* (2013.01); *C01P 2004/62* (2013.01); *C01P 2006/12* (2013.01); *C01P 2006/82* (2013.01); *C08K 3/26* (2013.01); *C08K 2201/003* (2013.01); *C08K 2201/006* (2013.01); *Y10T 428/2982* (2015.01)

(58) Field of Classification Search
CPC ...... C08K 9/04; C08K 2003/265; C01F 11/18; C01F 11/185; C09C 1/021
See application file for complete search history.

(56) References Cited

U.S. PATENT DOCUMENTS 6,368,638 B1 *   4/2002   Tiongson ............. A61K 9/0095
                                                       424/468

FOREIGN PATENT DOCUMENTS

| | | | | |
|---|---|---|---|---|
| CA | 2806131 | A1 * | 2/2012 | .............. B82Y 30/00 |
| CN | 101648723 | A * | 2/2010 | |
| JP | 61-097363 | A | 5/1986 | |
| JP | 07-088487 | A | 4/1995 | |
| JP | 08-231760 | A | 9/1996 | |
| JP | 2005-336417 | A | 12/2005 | |
| JP | 2009-073882 | A | 4/2009 | |
| JP | 2011-011924 | A | 1/2011 | |
| JP | 2012-148905 | A | 8/2012 | |
| WO | WO 2011147778 | A1 * | 12/2011 | ............... C08K 9/04 |

* cited by examiner

*Primary Examiner* — Vickey Nerangis
(74) *Attorney, Agent, or Firm* — Kratz, Quintos & Hanson, LLP

(57) ABSTRACT

A surface-treated heavy calcium carbonate is provided which is useful for a film exactly controlled in its pore diameter and for easily hydrolyzable polyester resins. A heavy calcium carbonate is also provided which is compounded in a curable resin such as a one-component moisture-curable adhesive and a sealant either without any pre-drying treatment or by simple pre-drying treatment. A surface-treated heavy calcium carbonate satisfying $13{,}000 \leq A \leq 25{,}000$, $0.8 \leq B \leq 3.0$, $C \geq 0.55$, and $0 \leq D1 \leq 1000$, or $8{,}000 \leq A \leq 25{,}000$, $0.8 \leq B \leq 15$, $0 \leq C1 \leq 1000$, and $0 \leq C2 \leq 150$ wherein: A: specific surface area ($cm^2/g$), B: average particle diameter (μm): 50% particle diameter (d50) (μm), C: 10% particle diameter (μm), D1, C1: water content at between 25° C. and 300° C. by a Karl-Fischer method (heating vaporization method) (ppm), and C2: water content at between 200° C. and 300° C. by the same method.

17 Claims, No Drawings

HEAVY CALCIUM CARBONATE, PRODUCTION METHOD THEREFOR, AND RESIN COMPOSITION CONTAINING SAID CALCIUM CARBONATE

TECHNICAL FIELD

The present invention relates to heavy calcium carbonate, a method for producing heavy calcium carbonate, and a resin composition containing surface-treated heavy calcium carbonate.

BACKGROUND ART

There have been many proposals including a method of producing a porous film with communicated voids generated therein by stretching, in a uniaxial or biaxial direction, a film produced by formulating an inorganic filler such as calcium carbonate in a film-producing resin such as a polyolefin resin. Many proposals have been offered to use these porous films in various fields such as sanitary materials, medical materials, building materials, agriculture sheets and battery separators.

Although calcium carbonate is a filler which is inert and difficult to wear away production equipments, it has a hydrophilic surface and is therefore highly hygroscopic and less affinity to resins. Therefore, these drawbacks are improved by surface treatment. However, there is a fear that an insufficient performance is only obtained for the reason that calcium carbonate has inferior dispersibility in resins when it is used in sophisticated applications.

Various studies have been made to improve this problem as to inferior dispersibility. For example, a trial has been made to dehumidify a calcium carbonate filler by adding quicklime. However, quicklime has a problem concerning micronization difficulty and also, has the problem that it tends to abrade a kneader and a molding apparatus more easily than calcium carbonate. Also, though studies as to the addition of a dehydrating agent such as vinyl silane are being made, it poses a problem as to a cost-up factor.

Meanwhile, examples of reasons of inferior dispersion include various reasons caused by a filler, for example, deficiency or excess of affinity between a resin and a filler and uneven surface treatment by a filler. However, when water already exists on the surface of a calcium carbonate particle, the particles are easily coagulated and therefore, surface treatment using a hydrophobic organic material cannot be sufficiently performed.

This is the cause why water and low-molecular organic substances (low-boiling point) in a resin composition are vaporized by heating during kneading with a resin, leading to the formation of silver streaks and gas marks, which hinders film formation or the cause of an immixture of abnormally large voids in voids formed on the porous film to be obtained even if a film is formed successfully.

Also, polyester resins such as bioplastics, PET and PEN tend to be hydrolyzed by water. Generally, defects such as gas marks are regarded as problems if water content in a resin composition (compound) is more than 100 ppm.

These problems may be solved if calcium carbonate which has lower water content, or is less hygroscopic, or is easily dried can be provided. For instance, it is generally known that calcium carbonate is surface-treated after wet grinding, resulting in reduction of water content. However, this process essentially needs dehydration and drying steps and therefore brings about disadvantages on cost. Also, when specific surface area is increased, water content is increased, which limits the use thereof. Also, there is, for example, a method in which quicklime is added as a dehydrating agent to adsorb water. This method, however, raises the pH of the resin composition and is therefore limited in its use. Also, its reactivity makes it difficult to micronize it and its coarse particles pose a problem when it is used, particularly, in film fields.

It has been reported so far that when a light calcium carbonate filler is produced by heating to a powder temperature of 200 to 350° C. using high-speed stirring at a peripheral speed of 20 m/s or more to dehydrate to a level of a water content of 0.02% by weight or less, followed by adding a fatty acid metal soap or nonionic surfactant to mix the both at a temperature more than the melting point of the soap or surfactant and less than 180° C., and the obtained filler is formulated in a plastic and injection-molded to obtain a molded article 4 mm in thickness, the molded article is resistant to generation of a silver mark caused by water and is greatly improved in impact resistance, surface glossiness and heat resistance (Patent Document 1).

PRIOR ART DOCUMENTS

Patent Documents

Patent Document 1: JP-A-61-97363

SUMMARY OF THE INVENTION

Problems to be Solved by the Invention

In the above described Patent Document 1, heavy calcium carbonate having an average particle diameter of 3 μm and a water content of 0.1% by weight is dried at a powder temperature of 280 to 300° C., for 25 main while stirring at a peripheral speed of 40 m/s by using a Henschel mixer and then, 2% of calcium stearate is added thereto, followed by mixing at 160° C. to obtain surface-treated heavy calcium carbonate having a water content of 0.009% by weight.

However, with regard to the equipment, it is difficult to raise the temperature to 280 to 300° C. with the agitation heat of a Henschel mixer. Also, even if an oil medium is allowed to circulate in a jacket, the seal part is easily damaged and it is therefore difficult to maintain the equipment, which disturbs a long-term continuous operation. Moreover, in the applied properties of a product obtained when this heavy calcium carbonate is compounded in polypropylene, any silver mark is not generated. However, this product is inferior in surface glossiness and impact resistance and therefore, no satisfactory effect is obtained. Also, it is hard to say that this product is sufficiently used for a thin film which needs extremely low water content to restrict the generation of pinholes.

Also, if this heavy calcium carbonate is left in the atmosphere, water is readsorbed and therefore, the water content thereof is not kept sufficiently low when the calcium carbonate is used. Therefore, the use of this heavy calcium carbonate has failed to reach the stage where a drying process for a one-component adhesive or one-component sealant can be omitted.

In view of this situation, the present inventors have considered that among calcium carbonate, heavy calcium carbonate produced by physical means such as milling and classification is advantageous to reduce water content because the initial water content thereof is relatively small, and made an extensive series of studies. As a result, the present inventors have found that the above problems can be solved by a filler which is produced using heavy calcium carbonate by adjusting the calcium carbonate so as to have the particle size characteristics required for an objective film, an adhesive, a sealant, or the like, by drying using an appropriate heating method and heating condition to reduce water content, and, further, by carrying out hydrophobic surface treatment. The present invention was thus completed.

Accordingly, a main aspect of a first present invention is to provide a surface-treated heavy calcium carbonate which has advantages on cost because it can be produced in a dry system and is also suitable for the production of, for example, a porous film having a precisely controlled pore diameter due to its excellent dispersibility and low water content required for a filler when formulated in a film forming resin, a method for producing the calcium carbonate, and also a resin composition containing the calcium carbonate.

A main aspect of a second present invention is to provide a heavy calcium carbonate which has advantages on cost because it can be produced in a dry system, and for example, it requires no predrying or only simple drying, making possible to greatly shorten the process steps when formulating a one component type moisture-curable adhesive.

According to an aspect of a first present invention, there is provided a surface-treated heavy calcium carbonate satisfying the following formulae (1) to (4):

$$13,000 \leq A \leq 25,000 \quad (1)$$

$$0.8 \leq B \leq 3.0 \quad (2)$$

$$C \geq 0.55 \quad (3)$$

$$0 \leq D \leq 1000 \quad (4)$$

wherein:

A: specific surface area measured by an air permeability method ($cm^2/g$),

B: average particle diameter (μm): 50% particle diameter of a particle measured by a Microtrac MT3300 laser particle size distribution analyzer (d50), C: 10% particle diameter in a particle size distribution measured by a Microtrac MT3300 laser particle size distribution analyzer (μm), and D1: water content measured at a temperature between 25° C. and 300° C. by a Karl-Fischer method (heating vaporization method) (ppm).

According to another aspect of the present invention, there is provided a surface-treated heavy calcium carbonate further satisfying the following formulae (5) and (6):

$$E \leq 8 \quad (5)$$

$$0 \leq D2 \leq 150 \quad (6)$$

wherein:

E: 90% particle diameter in a particle size distribution measured by a Microtrac MT3300 laser particle size distribution analyzer (μm), and D2: water content measured at a temperature between 200° C. and 300° C. by a Karl-Fischer method (heating vaporization method) (ppm).

According to still another aspect of the present invention, there is provided a surface-treated heavy calcium carbonate further satisfying the following formula (7):

$$8.0 \leq F \leq 9.8 \quad (7)$$

wherein:

F: pH of an aqueous 10 wt % suspension of the surface-treated heavy calcium carbonate.

According to still another aspect of the present invention, the surface treating agent is at least one selected from the group consisting of a fatty acid, its derivative and a phosphoric ester.

According to still further aspect of the present invention, there is provided a method for producing the above surface-treated heavy calcium carbonate, the method including heat-treating heavy calcium carbonate at 200° C. or more to 800° C. or less by a heating apparatus selected from a kiln, an electric furnace and a microwave furnace, after classifying the calcium carbonate, and surface-treating the heavy calcium carbonate by using a surface treating agent.

According to still further aspect of the present invention, there is provided a method for producing the above surface-treated heavy calcium carbonate, the method including heat-treating heavy calcium carbonate at 200° C. or more to 800° C. or less by a heating apparatus selected from a kiln, an electric furnace and a microwave furnace, classifying the heavy calcium carbonate, and surface-treating the heavy calcium carbonate with a surface treating agent.

According to still further aspect of the present invention, there is provided a resin composition containing the above surface-treated heavy calcium carbonate.

According to still further aspect of the present invention, the resin is a thermoplastic resin.

According to still further aspect of the present invention, the thermoplastic resin is a polyolefin resin or a polyester resin.

According to still further aspect of the present invention, the resin composition is for use in films.

Also, according to an aspect of a second present invention, there is provided a heavy calcium carbonate satisfying the following formulae (1) to (4):

$$8,000 \leq A \leq 25,000 \quad (1)$$

$$0.8 \leq B \leq 15 \quad (2)$$

$$0 \leq C1 \leq 1000 \quad (3)$$

$$0 \leq C2 \leq 150 \quad (4)$$

wherein:

A: specific surface area measured by an air permeability method ($cm^2/g$),

B: average particle diameter (μm): 50% particle diameter of a particle measured by a Microtrac MT3300 laser particle size distribution analyzer (d50), C1: water content measured at a temperature between 25° C. and 300° C. by a Karl-Fischer method (heating vaporization method) (ppm), and C2: water content measured at a temperature between 200° C. and 300° C. by a Karl-Fischer method (heating vaporization method) (ppm).

According to another aspect of the present invention, there is provided a heavy calcium carbonate surface-treated by at least one surface-treating agent selected from the group consisting of a fatty acid and its derivative.

According to still further aspect of the present invention, there is provided a method for producing the above heavy calcium carbonate, the method including heat-treating heavy calcium carbonate at 200° C. or more to 800° C. or less by a heating apparatus selected from a kiln, an electric furnace and a microwave furnace.

According to still further aspect of the present invention, there is provided a method for producing heavy calcium carbonate, the method including surface treating the heavy calcium carbonate after the above heat treatment.

According to still further aspect of the present invention, there is provided a resin composition comprising a resin and the above heavy calcium carbonate.

According to still further aspect of the present invention, the resin is a curable resin.

According to still further aspect of the present invention, there is provided the resin composition is for use in a one-component adhesive.

Effects of the Invention

The surface-treated heavy calcium carbonate according to a first present invention can be produced in a dry system and therefore has advantages on cost. When the surface-treated heavy calcium carbonate is compounded in, for example, a film forming resin, this resin composition is suitable for the production of a porous film having a precisely controlled pore diameter because it has high dispersibility and low water content characteristic required for a filler.

The surface-treated heavy calcium carbonate of the present invention has a low water content characteristic and is therefore suitable for easily hydrolyzable polyester resins such as bioplastics, PET and PEN, and also for resins called engineering plastics such as nylon and polycarbonate which have so high glass transition temperature that they must be kneaded at a high temperature.

The surface-treated heavy calcium carbonate according to a second present invention can be produced in a dry system and therefore has advantages on cost. Heavy calcium carbonate is provided which can be sufficiently dehydrated without any predrying or by simple predrying when the surface-treated heavy calcium carbonate is compounded in, for example, a one-component moisture-curable adhesive. Moreover, cooling time when the heavy calcium carbonate is dried can be shortened. Specifically, even if the process is simplified, an adhesive or sealant which is reduced in viscosity change with time and has high storage stability can be provided.

EMBODIMENTS OF THE INVENTION

The surface-treated heavy calcium carbonate according to a first present invention is characterized in that it satisfies the following formulae (1), (2), and (3) defining particle size characteristics, and the following formula (4) defining a water content:

$$13{,}000 \le A \le 25{,}000 \quad (1)$$

$$0.8 \le B \le 3.0 \quad (2)$$

$$C \ge 0.55 \quad (3)$$

$$0 \le D1 \le 1000 \quad (4)$$

wherein:
A: specific surface area measured by an air permeability method ($cm^2/g$),
B: average particle diameter ($\mu m$): 50% particle diameter of a particle measured by a Microtrac MT3300 laser particle size distribution analyzer (d50),
C: 10% particle diameter in a particle size distribution measured by a Microtrac MT3300 laser particle size distribution analyzer (min), and
D1: water content measured at a temperature between 25° C. and 300° C. by a Karl-Fischer method (heating vaporization method) (ppm).

The surface-treated heavy calcium carbonate according to a first present invention needs to have a specific surface area A from 13,000 to 25,000 $cm^2/g$, preferably 14,000 to 20,000 $cm^2/g$, and more preferably 15,000 to 18,000 $cm^2/g$ measured by an air permeability method.

When the specific surface area A exceeds 25,000 $cm^2/g$, this is undesirable in view of dispersibility and also, a larger surface area increases the content of water to be adsorbed. When the specific surface area is less than 13,000 $cm^2/g$, the primary particle size is so large that pores larger in size than intended ones are produced when the calcium carbonate is compounded in a battery separator film and thus the calcium carbonate particles are not suitable as particles to be used in a lithium secondary battery. Also, because, for example, a breathable film for a paper diaper is reduced in film thickness year by year from the viewpoint of cost-down, environmental protection and comfort when it is put on the body, the presence of larger primary particles occurs the possibility of generation of fisheyes, bringing about reduced water bearing pressure, which is undesirable.

The specific surface area A measured by an air permeability method was measured by the following method.

The specific surface area A was measured using a constant-pressure powder specific surface area analyzer (SS-100, manufactured by Shimadzu Corporation) in the following measuring conditions:
Specific gravity of the heavy calcium carbonate: 2.7 g/ml
Sample: 2.7 g
Amount of water to be permeated: 5 ml
Thickness of the sample layer: adjusted as mentioned below:
8 mm to 9 mm when the specific surface area is less than 10000 $cm^2/g$;
9 mm to 12 mm when the specific surface area is 10000 $cm^2/g$ or more and 20000 $cm^2/g$ or less; and
12 mm to 13 mm when the specific surface area exceeds 20000 $cm^2/g$.

The surface-treated heavy calcium carbonate according to a first aspect of the present invention needs to have an average particle diameter B of 0.8 to 3.0 $\mu m$, preferably 1.3 to 2.5 $\mu m$, and more preferably 1.8 to 2.3 $\mu m$ measured by a Microtrac MT3300 manufactured by Leeds & Northrup Co.

Although it is technically possible to reduce the average particle diameter B to less than 0.8 $\mu m$, the content of ultrafine powder is increased, which is disadvantageous in the point of water removal. Also, the powder exists in the form of aggregated secondary particles as it is even in a resin, which is undesirable. When the average particle diameter B exceeds 3.0 $\mu m$, a film such as paper diapers produced by stretching has an excessively large pore diameter in its opening part, which is undesirable for use as a permeable film.

The surface-treated heavy calcium carbonate according to a first present invention needs to have a 10% particle diameter C of 0.55 $\mu m$ or more, preferably 0.60 $\mu m$ or more, and more preferably 0.65 $\mu m$ or more in a particle size distribution measured by a Microtrac MT3300. When the 10% particle diameter C is less than 0.55 $\mu m$, this increases the frequency of ultrafine powder to which water is easily adsorbed and therefore, the reduction of water content cannot be attained. Also, when calcium carbonate containing this ultrafine powder is used for a porous film produced by stretching a film, there is the case where particles follow the resin to generate no void or the case where a very small void is produced, so that the particles do not contribute to the function of the film. Moreover, though it is necessary to raise the MFR of a compound with increase in the extrusion speed of a film in these days, the viscosity of the resin is increased, leading to a low MFR if many microparticles are contained. Although there is no particular limitation to the upper limit of the 10% particle diameter C, the 10% particle diameter is preferably nearer to D50.

In the meantime, the frequency of ultrafine powder is optimized by a method given as an example in which heavy calcium carbonate reduced in specific surface area through micropowder cutting-off process at least one time is used as starting material, then classified for particle size adjustment and further surface-treated to produce a powder. Classification may be utilized for cutting off micropowder. Although the micropowder cutting-off process is preferably performed prior to the surface treatment of heavy calcium carbonate in light of water removal, it may be also performed, after the surface treatment or may be added as needed. Although the classification may be any of wet classification utilizing water and dry classification utilizing air, the dry classification is desirable in workability and in the point that it requires no energy for drying. The classification may be performed either before or after the heat treatment.

The 10% particle diameter C can be obtained by classification to cut off microparticles even from, for example, commercially available and untreated heavy calcium carbonate microparticles having a specific surface area exceeding 25,000 $cm^2/g$. Comparatively, the average particle diameter B is shifted to the slightly larger side by cutting off the microparticles. However, the reduction of the specific surface area significantly contributes to the reduction in water content.

It is noted that methanol was used as the medium used for the measurement using Microtrac MT3300. Also, in the measurement, it was measured after a methanol slurry used for the measurement was ultrasonically irradiated at 300 μA for 60 seconds by using an ultrasonic dispersing machine (Ultra. Sonic Generator US-300T, manufactured by Nihon Seiki Co., Ltd.) to carry out preliminary dispersion.

In the surface-treated heavy calcium carbonate according to a first present invention, it is necessary that the water content D1 measured at a temperature between 25° C. and 300° C. by a Karl-Fischer method (heating vaporization method) (ppm) be 1000 ppm or less, preferably 700 ppm or less, and more preferably 500 ppm or less. Until the temperature from 25 to 300° C., water is relatively releasable adsorbed water, so that water can be removed to some extent by drying or vacuum bent during kneading. However, when the water content exceeds 1000 ppm, the amount of water which is not removed is increased. The increase in the amount of water which is not removed is undesirable because the surface-treated heavy calcium carbonate of the present invention is preferably to provide a calcium carbonate filler used to obtain a resin composition (compound) having a low water content without predrying prior to kneading.

Also, in the surface-treated heavy calcium carbonate according to a first present invention, it is necessary that the water content D2 measured at a temperature between 200° C. and 300° C. by a Karl-Fischer method (heating vaporization method) (ppm) be 150 ppm or less, preferably 100 ppm or less, and more preferably 50 ppm or less. When the water content D2 exceeds 150 ppm, the calcium carbonate tends to reabsorb moisture after the surface treatment and also, it is difficult to remove water mechanically by predrying or by kneading.

The water contents D1 and D2 can be controlled by heating heavy calcium carbonate. Although the heating condition cannot be defined generally because it is varied according to temperature and time, it is desirable to heat at a constant product temperature at 200° C. or more and 800° C. or less, preferably 250° C. or more and 700° C. or less, and more preferably 300° C. or more and 600° C. or less. Particularly, with regard to the water content D2, it is considered that ultrafine particles in the heavy calcium carbonate are sintered on the surface of a relatively large particle or a mesopore generated by milling is shrunk by sintering, and the specific surface area is therefore decreased to result in reduced water content. At a temperature less than 200° C., only water adsorbed to powder surface is desorbed and water chemically adsorbed to the surface is not desorbed. Also, the temperature less than 200° C. is undesirable because readsorption of moisture is increased. Also, if the temperature is higher than 800° C., this is undesirable because quicklime is formed to the inside of a particle, which raises the pH and the particle is grown into a coagulated coarse particle by sintering, depending on retention time.

Examples of the heating apparatus used for heating treatment include kilns such as a tunnel kiln, roller house kiln, pusher kiln, shuttle kiln, and elevator kiln, and electric furnaces. Examples of the rotary kiln include an external heating system rotary kiln, internal heating system rotary kiln and batch system rotary kiln. Moreover, examples of the heater also include microwave furnaces obtained by combining these heaters with a microwave. A rotary kiln is preferable and particularly, an external heating system heater is preferable taking cost, workability, and unevenness of heat history into account. There is a fear that the internal heating system rotary kiln deteriorates the whiteness of a powder and the batch system is less efficient in consideration of surface treatment performed in the subsequent step.

The water contents D1 and D2 in the Karl-Fischer method (heating vaporization method) were measured by the following method.

Using a water vaporizer (VA-100, manufactured by Mitsubishi Chemical Corporation), the water content of heavy calcium carbonate was measured three times through the Karl-Fischer moisture meter (CA-100, manufactured by Mitsubishi Chemical Corporation) and these measured water contents were averaged.

In this case, a heavy calcium carbonate sample is measured after being left to stand for 2 days or more in a room controlled at 25° C. The measuring conditions are as follows:

Starting temperature in the temperature rise operation: 25° C.

End temperature in the temperature rise operation: 300° C.

Step temperature: 100° C.

End point detection level: 0.1 μg/s

Titration start delay time: 2 min

Conduction gas: $N_2$ gas

Amount of conduction gas: 250 ml/min

Amount of a sample: 1 g

The surface-treated heavy calcium carbonate according to a first aspect of the present invention preferably has a 90% particle diameter E of 8 μm or less and more preferably 6 μm or less in a particle size distribution measured by a Microtrac MT3300. When E exceeds 8 μm, this means that the frequency of relatively large particles is higher and there is a fear that a void larger than intended ones is produced when these particles are formulated in a porous film for paper diapers. The 90% particle diameter E is larger than the average particle diameter B in principle.

The surface-treated heavy calcium carbonate according to a first present invention preferably has a pH F of 8.0 to 9.8 and more preferably 8.0 to 9.6 measured in the state of an aqueous 10% suspension. Although it is technically possible to reduce the pH F to less than 8.0 by selecting a surface treating agent and an amount of surface treatment, this is undesirable in view of cost, whereas if the pH F is set to the strong alkali side exceeding 9.8, this arouses a fear of deterioration of a film and a fear of causing the injury of sensitive skin parts in applications, for example, paper diapers, like those used in contact with the human skin, which is undesirable. Also, a resin which is easily hydrolyzable like a polyester resin is particularly undesirable.

The pH F, when using the surface-treated heavy calcium carbonate in the state of an aqueous 10% suspension, was measured in the following manner: 5 g of a sample was poured into 45 g of ion exchange water, then sufficiently shaken and then allowed to stand for 20 min to measure the aqueous suspension by a pH meter.

Also, the surface-treated heavy calcium carbonate according to a first present invention preferably has a residue amount G remaining on a sieve of 10 ppm or less and more preferably 5 ppm or less measured using a JIS standard sieve with a mesh size of 38 μm according to the following test method. When the residue amount G on a sieve exceeds 10 ppm, this is undesirable because a fisheye is easily produced when a film is made thin and for example, when a permeable film for paper diapers is thinned. Coarse particles having an influence on the above E and G can be removed by a classification process using a sieve, and for example, by passing particles through a sieve such as a vibrating screen in a classification process using a screen, in addition to air classification. The removal of coarse particles may be performed as needed either before or after the surface treatment.

(Screening Test Method)

Into a 2 L stainless beaker is weighed 400 g of a sample and 800 g of industrial methanol is added thereto to form a slurry. This slurry is poured from above a JIS standard sieve with a mesh size of 38 μm with slightly stirring by a brush to allow the sample to pass. A solid substance attached to the brush is also washed away by using water and the surface of the sieve is cleaned by slightly wiping using a brush until the solution passing through the sieve becomes perfectly transparent. Next, the residue is transferred to a JIS standard sieve with an inside diameter of 75 mm and a mesh size of 38 μm and allowed to stand in a dryer (1.05° C.) for 30 min or more. Then, the dried residue is allowed to cool in a desiccator for 15 min and then, the residue is put on paper for wrapping powdered medicine to measure the amount of sieved residue.

Any material may be used as the surface treating agent used in the surface-treated heavy calcium carbonate according to a first present invention insofar as it is an organic material. Specific examples of the surface treating agent include fatty acid ester type lubricants such as higher fatty acid esters of monohydric alcohols, higher fatty acid esters of polyhydric alcohols, and partial hydrolysates of montan wax type and very-long chain esters; and nonionic surfactants such as polyoxyethylene glycerin fatty acid esters, polyoxyethylene hydrogenated castor oil, polyoxyethylene sorbitan fatty acid esters, polyoxyethylene sorbitol fatty acid esters, polyethylene glycol fatty acid esters, polyglycerin fatty acid esters, polyglycerin fatty acid esters and sorbitan fatty acid esters. These compounds may be used either singly or in combinations of two or more. In this case, examples of the above monohydric alcohol include alcohols having 1 to 18 carbon atoms such as methyl alcohol, ethyl alcohol, propyl alcohol and butyl alcohol, and examples of the polyhydric alcohols include ethylene glycol, glycerin and sorbitol. Examples of the higher fatty acid include fatty acids having 8 to 18 carbon atoms such as lauric acid, myristic acid, palmitic acid and stearic acid.

Further examples of the surface treating agent include fatty acids such as oleic acid, lauric acid, myristic acid, isotridecyl myristate, palmitic acid, behenic acid, stearic acid and isostearic acid; amides or bisamides of the above fatty acids; higher alcohols or branched higher alcohols such as stearyl alcohol; metal soap type lubricants such as barium stearate, calcium stearate, aluminum stearate, zinc stearate, and magnesium stearate or their complexes; aliphatic hydrocarbon type lubricants such as liquid paraffin having 16 or more of carbon atoms, microcrystalline wax, natural paraffin, synthetic paraffin, and polyolefin wax and partial oxides of these compounds, and fluorides or chlorides of these compounds; oil agents such as silicone oil, soybean oil, coconut oil, palm kernel oil, linseed oil, rapeseed oil, cotton seed oil, tung oil, castor oil, beef tallow, squalane, lanoline and hydrogenated oils; carboxylates such as N-acylamino acid salts, alkyl ether carboxylates and acylated peptide; sulfonates such as alkyl sulfonates, alkyl benzene or alkylnaphthalene sulfonates, sulfone succinates, α-olefin sulfonates and N-acyl sulfonates; sulfates such as sulfonated oil, alkyl sulfates, alkyl ether sulfates, alkyl aryl ether sulfates and alkylamide sulfates; phosphates like alkyl phosphates such as trimethyl phosphate, triethyl phosphate and triphenyl phosphate, alkyl ether phosphates and alkyl aryl ether phosphates; cationic surfactants such as aliphatic amine salts, aliphatic quaternary ammonium salts, benzalkonium salts, benzethonium chloride, pyridinium salts and imidazolinium salts; amphoteric surfactants such as carboxybetaine types, aminocarboxylates, imidazolinium betaine and lecithin; nonionic surfactants such as polyoxyethylene alkyl ether, polyoxyethylene secondary alcohol ether, polyoxyethylene alkylphenyl ether, polyoxyethylene sterol ether, polyoxyethylene lanoline derivatives, ethylene oxide derivatives of alkylphenol-formalin condensates, polyoxyethylene-polyoxypropylene block polymers, polyoxyethylene-polyoxypropylene alkyl ether, fatty acid alkanolamide, polyoxyethylene fatty acid ester amide, polyoxyethylene alkylamine and alkylamine oxide; fluorine type surfactants; and reactive surfactants such as polyoxyethylene allyl glycidyl nonyl phenyl ether. These compounds may be used either singly or in combinations of two or more. Moreover, these compounds may be used in combination with the aforementioned nonionic surfactants.

Among these surface treating agents, saturated fatty acids such as lauric acid, palmitic acid, stearic acid and behenic acid are preferable in view of performance and cost. Also, phosphates such as trimethyl phosphate, triethyl phosphate and triphenyl phosphate are preferable for hydrolyzable polyester resins such as polyethylene terephthalate and bioplastics and resins kneaded at a high temperature.

The surface-treated heavy calcium carbonate according to a first present invention is produced by heating heavy calcium carbonate having controlled particle size characteristics and then by surface-treating the heavy calcium carbonate using a surface treating agent. As the heating apparatus, various types of kilns, electric furnaces, or microwave furnaces are preferably used as mentioned above. The heating conditions are appropriately determined taking heating temperature, heating time (retention time) and the like into account.

The surface-treated calcium carbonate obtained in the above manner is reduced in water content, is also highly dispersible in various types of resins, rubbers, paints and the like, and is particularly superior in compatibility with and dispersibility in resins.

No particular limitation is imposed on the resin and, for example, polyolefin resins such as polyethylene and polypropylene, styrene resins, (meth) acryl resins, vinyl acetate resins, vinyl chloride resins, vinylidene chloride resins, polyamide resins, bioplastics, polyester resins, polyphenylene sulfide, nylon and fluorine type resins are suitable for applications with strength-deterioration or durability problems when water content is increased in a resin composition. These resins are used either singly or in combinations of two or more according to the need. Among these resins, polyolefin resins are preferable for films. Moreover, easily hydrolyzable polyester resins such as bioplastics, PET and PEN and also, resins called engineering plastics such as nylon and polycarbonate which have so high glass transition temperature that they must be kneaded at a high temperature, are preferable. With regard to the proportion of the resin, the content of the surface-treated heavy calcium carbonate is preferably 2 to 400 parts by weight based on 100 parts by weight of the resin in general.

The resin composition according to a first present invention may be formulated with, besides the above components, additives which are usually used in resin compositions, for example, a lubricant, antioxidant, heat stabilizer, light stabilizer, ultraviolet absorber, neutralizer, anticlouding agent, antiblocking agent, antistatic agent, slipping agent and colorants.

In the case of obtaining a film by using the resin composition as mentioned above, the resin composition is mixed using a known mixer such as a Henschel mixer, tumbler type mixer or ribbon blender and then, usually kneaded under heating by uniaxial or biaxial extruder, kneader or Bambury mixer to form a pellet. Or, a resin different from the above resin in characteristics and the surface-treated heavy calcium carbonate are formulated during the above kneading operation by using measures such as side feeding to carry out the next kneading continuously. This pellet is melted and made into a film by T-die extrusion or by using a known molding machine such as an inflation molding machine at a temperature of not less than the melting temperature of the above resin and less than the decomposition temperature of the resin. The resin composition may be made directly into a film by using T-die extrusion without pelletizing, depending on the case. Also, the resin composition may be formed into a film by blow molding. In the case of a sheet having a relatively high thickness, injection molding may be adopted.

The formed film is stretched in at least a uniaxial direction at the softening temperature or less by a known method such as a roll method or center method to cause interfacial peeling of calcium carbonate from the resin part, thereby producing a porous film.

The stretching may be carried out in one stage or divided two or more stages. Although the stretch ratio must be determined so as to accord to the characteristics of a desired porous film, a stretch ratio falling in a known range may be usually used. The stretch ratio is preferably 1.2 to 3. In the case of biaxial stretching, it may be carried out simultaneously in a flow direction and in a direction perpendicular to the flow direction, or separately, first in a flow direction and next in a direction perpendicular to the flow direction in order and vice versa. Also, after the stretching, thermal fixing treatment or washing with an acid solution or the like may be carried out to stabilize the opening shape of the obtained film.

There is no particular limitation to the thickness of the film produced according to a first present invention and the thickness may be controlled according to its use. Although, for example, a back sheet of a paper diaper usually has a basic weight of 16 to 50 gsm (g/m$^2$), a permeable film having a basic weight of 14 gsm (g/m$^2$) or less can be obtained by formulating the surface-treated heavy calcium carbonate of the present invention. Also, a disposable heating pad or a building material such as a car wrap and house wrap has a thickness of about 30 to 100 μm and a battery separator has a thickness of hundreds of micrometers in usual.

The physical properties of the porous film may be varied optionally according to the specific surface area of calcium carbonate, filling proportion, the type of surface treating agent, the composition of a film or sheet production resin (for example, the proportion of straight-chain polyethylene and branched polyethylene), the types of other additives, and stretching conditions (stretching direction, stretch ratio, stretching temperature, and thermal fixing treatment after stretching).

The porous film according to a first present invention has moderate air permeability, moisture permeability and adhesiveness and also, exhibits excellently uniform thickness and hardness. For this, the porous film can be extremely preferably used for sanitary materials such as disposable diapers, body fluid absorbent pads and bed sheets, medical supplies such as surgical gowns and hot compress materials, materials for clothing such as jackets and rain wears, building materials such as wallpapers, roof waterproofing materials and house wrap films, package materials for drying agents, desiccants, oxygen scavengers, disposable heating pads, packages for keeping of freshness and foods, and materials for agricultural permeable sheets, battery separators or the like.

The heavy calcium carbonate according to a second present invention is characterized in that it satisfies the following particle size characteristics (1) and (2) and water contents shown by (3) and (4):

$$8,000 \leq A \leq 25,000 \quad (1)$$

$$0.8 \leq B \leq 15 \quad (2)$$

$$0 \leq C1 \leq 1000 \quad (3)$$

$$0 \leq C2 \leq 150 \quad (4)$$

wherein:

A: specific surface area measured by an air permeability method (cm$^2$/g),

B: average particle diameter (μm) of calcium carbonate powder: 50% particle diameter of a particle measured by a Microtrac MT3300 laser particle size distribution analyzer (d50), C1: water content measured at a temperature between ordinary temperature and 300° C. by a Karl-Fischer method (heating vaporization method) (ppm), and C2: water content measured at a temperature between 200° C. and 300° C. by a Karl-Fischer method (heating vaporization method) (ppm).

The heavy calcium carbonate according to a second present invention needs to have a specific surface area A from 8,000 to 25,000 cm$^2$/g, preferably 10,000 to 20,000 cm$^2$/g, and more preferably 12,000 to 18,000 cm$^2$/g measured by an air permeation method.

When the specific surface area. A exceeds 25,000 cm$^2$/g, this is undesirable in view of dispersibility and also, a larger surface area increases the content of water to be adsorbed. When the specific surface area exceeds 10,000 cm$^2$/g, surface treatment for making the surface hydrophobization is preferable to omit the drying step. When the specific surface area is less than 8,000 cm$^2$/g on the other hand, the thixotropy of the heavy calcium carbonate is not enough to use it as a sealant and therefore, the heavy calcium carbonate is deteriorated in workability.

The specific surface area A measured by an air permeability method was measured by the following method.

The specific surface area A was measured using a constant-pressure powder specific surface area analyzer (SS-100, manufactured by Shimadzu Corporation) in the following measuring conditions:

Specific gravity of the heavy calcium carbonate: 2.7 g/ml
Sample: 2.7 g
Amount of water to be permeated: 5 ml
Thickness of the sample layer: adjusted to as mentioned below;
8 mm to 9 mm when the specific surface area is less than 10000 cm$^2$/g;
9 mm to 12 mm when the specific surface area is 10000 cm$^2$/g or more and 20000 cm$^2$/g or less; and
12 mm to 13 mm when the specific surface area exceeds 20000 cm$^2$/g.

The heavy calcium carbonate according to a second present invention needs to have an average particle diameter B of 0.8 to 15.0 µm, preferably 1.5 to 10 µm, and more preferably 2 to 7 µm measured by a Microtrac MT3300 manufactured by Leeds & Northrup Co.

Although it is technically possible to reduce the average particle diameter B to less than 0.8 µm, the content of ultrafine powder is increased, which is disadvantageous in the point of water removal. Also, the powder exists in the form of aggregated secondary particles as it is even in a resin, which is undesirable. When the average particle diameter B exceeds 15 µm on the other hand, this is undesirable, because, for example, the particles precipitate in an adhesive.

It is noted that methanol was used as the medium used for the measurement using Microtrac MT3300.

Also, in the measurement, it was measured after a methanol slurry used for the measurement was ultrasonically irradiated at 300 µA for 60 sec by using an ultrasonic dispersing machine (Ultra Sonic Generator US-300T, manufactured by Nihon Seiki Co., Ltd.) to carry out preliminary dispersion.

In the heavy calcium carbonate according to a second present invention, it is necessary that the water content C1 measured at a temperature between 25° C. and 300° C. by a Karl-Fischer method (heating vaporization method) be 1000 ppm or less, preferably 700 ppm or less, and more preferably 500 ppm or less. If C1 exceeds 1000 ppm, a drying step is usually necessary and if the heavy calcium carbonate is dried by heating under pressure, it takes a long time to dry and also, it usually takes 3 to 4 hours for cooling performed subsequently. Therefore, the object of the present invention which is to obtain a calcium carbonate filler from which a one-component adhesive can be obtained without predrying calcium carbonate is not attained.

Also, in the heavy calcium carbonate according to a second present invention, it is necessary that the water content C2 measured at a temperature between 200° C. and 300° C. satisfy the equation: $0 \leq C2 \leq 150$ (ppm), preferably $0 \leq C2 \leq 100$ (ppm), and more preferably $0 \leq C \leq 50$ (ppm). When C2 exceeds 150 ppm, the adhesive is highly possibly thickened with time in an adhesive cartridge, bringing about inferior storage stability and as a result, the object of the present invention is not achieved.

The water contents C1 and C2 can be reduced, for example, by heating heavy calcium carbonate at a product temperature of 200° C. or more and 800° C. or less, more preferably 250 to 700° C., and still more preferably 300 to 600° C. for a certain time. Particularly, with regard to the water content C2, it is considered that ultrafine particles in the heavy calcium carbonate are sintered on the surface of a relatively large particle or a mesopore which has a size of tens of angstroms and is generated by milling is shrunk by sintering, and the specific surface area is decreased, resulting in reduced water content. At a temperature less than 200° C., only water adsorbed to powder surface is desorbed and water chemically adsorbed to the surface is not desorbed. Also, the temperature less than 200° C. is undesirable because readsorption of moisture is increased and therefore, the object of the present invention cannot be attained. Also, if the heat treatment is carried out at a temperature higher than 800° C., this is undesirable because quicklime is formed to the inside of a particle, which raises the pH and the particle is grown into a coagulated coarse particle by sintering though depending on retention time.

As the heating apparatus used for heating treatment, the above heating apparatus used according to a first present invention is used.

The water contents C1 and C2 in the Karl-Fischer method (heating vaporization method) were measured by the following method.

Using a water vaporizer (VA-100, manufactured by Mitsubishi Chemical Corporation), the water content of heavy calcium carbonate was measured three times through the Karl-Fischer moisture meter (CA-100, manufactured by Mitsubishi Chemical Corporation) and these measured water contents were averaged.

In this case, a heavy calcium carbonate sample is measured after being left to stand for 2 days or more in a room controlled at 25° C. The measuring conditions are as follows:

Starting temperature in the temperature rise operation: 25° C.
End temperature in the temperature rise operation: 300° C.
Step temperature: 100° C.
End point detection level: 0.1 µg/s
Titration start delay time: 2 min
Conduction gas: N$_2$ gas
Amount of conduction gas: 250 ml/min
Amount of a sample: 1 g The heavy calcium carbonate according to a second present invention is preferably surface-treated hydrophobically. This reason is that when the specific surface area A exceeds 10,000 cm$^2$/g, the content of adsorbed water is increased with time in proportion to the surface area after heat treatment. Though the content of readsorbed water is very smaller than that obtained in the case of performing no heat treatment, this gives rise to a problem when the heavy calcium carbonate is used without any drying step. When the content of water exceeds 800 ppm, a drying process is required depending on the amount of the heavy calcium carbonate to be compounded. The drying time can be largely shortened by performing heat treatment. However, if the heavy calcium carbonate is used in wide fields, it is necessary to drop the surface tension thereof by performing surface treatment to make the surface hydrophobization. Particularly, when viscosity and thixotropy are required, the particle diameter of the heavy calcium carbonate must be small. In this case, sufficiently low water content is not obtained only by heat treatment.

As the surface treating agent used according to a second present invention, surface treating agents used according to a first present invention may be used. Among these surface treating agents, saturated fatty acids such as lauric acid, stearic acid and behenic acid and their derivatives such as methyl esters and butyl esters are preferable in view of performance and cost.

Because the heavy calcium carbonate obtained in the above manner has a low water content, it may be preferably formulated in a curable resin cured by water, for example, an adhesive and sealant. Examples of the one-component type moisture-curable adhesive and sealant according to the present invention include a one-component type moisture-curable urethane resin, silicone resin, modified silicone resin, polysulfide and epoxy resin.

The one-component moisture-curable urethane type adhesive or sealant includes a urethane prepolymer obtained by a reaction of a polyol which has a total two or more active hydrogen at its molecular terminal and usually a molecular weight of 100 to 20000 with a polyisocyanate compound such as aromatic polyisocyanates or aliphatic or alicyclic polyisocyanates, urethane prepolymer, filler, additives such as a polyethylene fiber and silica, and a diluent.

As the silicone resin type adhesive and sealant, a silicone type polymer having an alkoxysilyl group at its molecular terminal and a main chain structure made of an alkylene structure, for example, a polymer which has one or more types of, for example, a trialkoxysilyl group, alkyldialkoxysilyl group and dialkylalkoxysilyl group at its molecular terminal, a main chain structure made of a polyalkylene structure having a repeat unit such as ethylene, propylene, butylene or isobutylene, and a number average molecular weight of 1000 to 30000 is used.

As the modified silicone resin type adhesive and sealant, for example, a compound which is a polyether copolymer having a hydrolyzable silicon functional group at its terminal and also having an ether bond in its main chain structure is adopted, in which the terminal parts of the polyether polymers are hydrolyzed by the effect of a curing catalyst and combined with each other. Specific examples of the polyether copolymer include poly(methyldimethoxysilyl ether).

As the curing catalyst for the modified silicone resin, a known one may be used and, for example, organic calboxylates such as tin octoate, tin stearate, iron naphthalate and lead octoate, and organic tins such as di-n-butyltin-dilaurate and di-n-butyltin-diphthalate may be adopted either singly or by blending two or more.

In this case, the modified silicone resin may be used either singly or in combination with an epoxy resin. Because the combination with an epoxy resin can impart the cohesive force and hardness of the adhesive, the formulation may be decided in accordance with the performance required for the adhesive layer. When an epoxy resin is used together, aliphatic polyamine, alicyclic polyamine, norbornandiamine-epoxy adduct body, hydrophilic ketimine or hydrophobic ketimine or the like which is an epoxy resin curing agent may be adopted.

As the polysulfide resin type adhesive or sealant, a polymer is used, which has a reactive mercapto group at its terminal and a preferable molecular weight of 200 to 20000 and is prepared by formulating additives such as a filler, plasticizer, reaction control agent and tackifier in the polymer.

When the heavy calcium carbonate of the present invention is formulated in these one-component type moisture-curable adhesives, it can be used without any preliminary heating, and is therefore advantageous in view of workability and cost.

The amount of the heavy calcium carbonate of the present invention to be formulated is generally 1 to 200 parts by weight based on the total amount of the one-component type moisture-curable adhesive or sealant, though it is controlled according to the need. For example, in the one-component moisture-curable urethane resin type adhesive, the heavy calcium carbonate may be added, and formulated in an amount of about 10 to 300 parts by weight and preferably about 25 to 200 parts by weight based on 100 parts by weight of the urethane prepolymer.

A polyethylene fiber or silica may be formulated in the one-component moisture-curable urethane type adhesive and sealant composition for the purpose of imparting proper viscosity and thixotropy to thereby further impart coating workability, combed-line unevenness, and non-stickiness, and cohesive force of an adhesive coating. These polyethylene fiber and silica may be added and formulated in an amount of about 0.1 to 10 parts by weight and preferably about 0.5 to 8 parts by weight based on 100 parts by weight of the urethane prepolymer, though the blending amount of them is optional.

Examples of a diluent added to the one-component moisture-curable urethane type adhesive and sealant composition to drop the viscosity by diluting action include aromatic hydrocarbons such as toluene, xylene and mineral spirit, aliphatic hydrocarbons such as hexane, heptane and octane, alicyclic hydrocarbons such as methylcyclohexane, petroleum-based solvents including a gasoline fraction through kerosene fraction, esters such as 2,2,4-trimethyl-1,3-pentanediol diisobutylate (TXIB), ethyl acetate and butyl acetate, ketones such as acetone, methyl ethyl ketone, methyl isobutyl ketone and methylcyclohexane, ether esters such as tetrahydrofuran, cellosolve acetate and butylcellosolve acetate, and nitrogen-containing solvents such as N,N-dimethylformanmide, N,N-dimethylacetamide, 1-methyl-2-pyrrolidone and 1,3-dimethyl-2-imidazolidinone. Furthermore, N-alkyl-2-pyrrolidone (where, the alkyl group may be an octyl group or higher group), 2,2,4-trimethyl-1,3-pentanediolisobutylate-2-ethylhexanoate, 2,2,4-trimethyl-1,3-pentanedioldi-2-ethylhexanoate, alkyl esters of licinoleic acid (where, the alkyl group has one or more carbon atoms), dialkyl ester of adipic acid (where, the alkyl group has 8 or more carbon atoms), or the like may be formulated from the viewpoint of VOC measure. Aromatic solvents are preferable from the viewpoint of handling easiness and cost. Examples of the diluent and/or plasticizer include dioctyl phthalate (DOP), dibutyl phthalate (DBP), dilauryl phthalate (DLP), butylbenzyl phthalate (BBP), dioctyl adipate, diisononyl phthalate, diisodecyl adipate, diisodecyl phthalate, trioctyl phosphate, tris(chloroethyl) phosphate, tris(dichloropropyl) phosphate, polypropylene glycol adipate, polybutylene glycol adipate, alkyl epoxystearate and epoxidized soybean oil. These compounds may be used either singly or by mixing two or more.

The diluent may be added and formulated in an amount of about 1 to 100 parts by weight and preferably 5 to 50 parts by weight based on 100 parts by weight of the urethane prepolymer, though the blending amount thereof is optional.

Moreover, conventionally known additives may be contained in the one-component moisture-curable urethane type adhesive or sealant composition. Although, a filler made of, for example, aerosil, synthetic calcium carbonate, kaolin, clay talc or silica sand may be used, aerosil which needs no preliminary drying is preferable. Optional components such as titanium oxide, carbon black, colorants such as other dyes or pigments, stickiness and adhesiveness imparting agent, thickener, silane coupling agent, titanium coupling agent, pigment dispersant, anti-foaming agent and ultraviolet absorber may be contained.

EXAMPLES

First, the present invention will be explained in more detail by way of examples according to a first present invention and comparative examples, which are, however, not intended to be limiting of the present invention. In the following explanations, the designation "parts" indicate "parts by weight".

Example 1

Commercially available heavy calcium carbonate (Super #2000, manufactured by MARUO CALCIUM CO., LTD.) was used and heat-treated using an external heating type rotary kiln (manufactured by Takasago International Corporation, external dimension Ø: 150×2000 mm) in the following conditions: external heating temperature: 580° C., number of rotations of the retort: 4 rpm, angle: 60 mm, and feed rate: 6 kg/h. At this time, the product temperature was 420° C. and the retention time was about 10 min. The product was allowed to cool and surface-treated using a Super Mixer (SMV-20, manufactured by Kawata MFG Co., Ltd.). Into a mixer was poured 5.5 kg of the product and heated, 55 g of stearic acid melted by heating to 70° C. was added with stirring in the mixer after the product temperature reached 70° C., and the mixture was further heated until the product temperature reached 130° C. with stirring. Then, a mesh with 46 μm opening was fitted to a HI-BOLTA 300-model (manufactured by TOYO HITEC CO., LTD.; non-liner) and coarse particles and coagulated particles were eliminated from the obtained product by the mesh to obtain surface-treated heavy calcium carbonate having powder properties shown in Table 1.

Example 2

Commercially available heavy calcium carbonate (Super #2000, manufactured by MARUO CALCIUM CO., LTD.) was classified using a fluid classifier (Turboclassifier TC-15: registered trademark, manufactured by Nissin Engineering Inc.) in the following conditions: feed rate: 1.5 kg/h, number of rotations of a rotor: 8000 rpm, air flow rate: 1.5 m³/min, to recover the coarse powder part. This coarse powder part was heat-treated at 400° C. for 1 hr in an electric furnace. The resulting product was treated through surface treatment and screening step in the same manner as in Example 1 to obtain surface-treated heavy calcium carbonate having powder properties shown in Table 1.

Example 3

Surface-treated heavy calcium carbonate having powder properties shown in Table 1 was obtained through classification, heat treatment, and surface treatment in the same manner as in Example 2 except that commercially available heavy calcium carbonate (Nanox #25A, manufactured by MARUO CALCIUM CO., LTD.) was used. In this case, the amount of the surface treating agent was 71.5 g.

Example 4

Commercially available heavy calcium carbonate (Caltex 7, manufactured by MARUO CALCIUM CO., LTD.) was used to carry out heat treatment at 350° C. for 2 hr in an electric furnace. The resulting product was treated through surface treatment and screening step in the same manner as in Example 1 to obtain surface-treated heavy calcium carbonate having powder properties shown in Table 1. In this case, the amount of the surface treating agent was 82.5 g.

Example 5

Commercially available heavy calcium carbonate (Caltex 5, manufactured by MARUO CALCIUM CO., LTD.) was classified using a fluid classifier (Turboclassifier TC-15) in the following conditions: feed rate: 1.0 kg/h, number of rotations of a rotor: 12000 rpm, air flow rate: 1.5 m³/min, to recover the coarse powder part. This coarse powder part was heat-treated at 400° C. for 1 hr in an electric furnace. The resulting product was treated through surface treatment and screening step in the same manner as in Example 1 to obtain surface-treated heavy calcium carbonate having powder properties shown in Table 1. In this case, the amount of the surface treating agent was 82.5 g.

Example 6

Commercially available heavy calcium carbonate (Super #1500, manufactured by MARUO CALCIUM CO., LTD.) was used and heat-treated using an external heating type rotary kiln (manufactured by Takasago International Corporation, external dimension Ø: 150×2000 mm) in the following conditions: external heating temperature: 520° C., number of rotations of the retort: 4 rpm, angle: 60 mm, and feed rate: 6 kg/h. At this time, the product temperature was 380° C. and the retention time was about 10 min. The resulting product was treated through surface treatment and screening step in the same manner as in Example 1 to obtain surface-treated heavy calcium carbonate having powder properties shown in Table 1. In this case, the amount of the surface treating agent was 49.5 g.

Example 7

Surface-treated heavy calcium carbonate having powder properties shown in Table 1 was obtained through heat treatment, surface treatment, and screening step in the same manner as in Example 2 except that the surface treating agent used in Example 2 was altered to trimethyl phosphate and this trimethyl phosphate was added in an amount of 27.5 g at ordinary temperature.

Example 8

Surface-treated heavy calcium carbonate having powder properties shown in Table 1 was obtained through surface treating step in the same manner as in Example 1 except that that the condition of the electric furnace was altered to temperature of 750° C. and heat treating time of 1 hr to carry out heat treatment. In this case, the screening process was omitted.

Example 9

Commercially available heavy calcium carbonate (Super #2000, manufactured by MARUO CALCIUM CO., LTD.)

was used and heat-treated at 250° C. for 2 hr in an electric furnace. The resulting product was treated through surface treatment and screening step in the same manner as in Example 1 to obtain surface-treated heavy calcium carbonate having powder properties shown in Table 1.

Example 10

Surface-treated heavy calcium carbonate having powder properties shown in Table 1 was obtained through heat treatment and screening step in the same manner as in Example 4 except that the surface treating agent used in Example 4 was altered to triethyl phosphate.

Comparative Example 1

Surface-treated heavy calcium carbonate having powder properties shown in Table 2 was obtained in the same manner as in Example 1 except that the heat treatment using a rotary kiln in Example 1 was not performed.

Comparative Example 2

A MC Coat S-14 (manufactured by MARUO CALCIUM CO., LTD.) which was commercially available surface-treated heavy calcium carbonate was prepared.

Comparative Example 3

Surface-treated heavy calcium carbonate having powder properties shown in Table 2 was obtained through heat treatment, surface treatment, and screening step in the same manner as in Example 1 except that commercially available heavy calcium carbonate (Nanox #30, manufactured by MARUO CALCIUM CO., LTD.) was used.

Comparative Example 4

Surface-treated heavy calcium carbonate having powder properties shown in Table 2 was obtained through surface treatment and screening step in the same manner as in Example 7 except that the heat treatment was not performed.

Comparative Example 5

A Super S (manufactured by MARUO CALCIUM CO., LTD.) which was commercially available surface-treated heavy calcium carbonate was prepared.

Comparative Example 6

Surface-treated heavy calcium carbonate having powder properties shown in Table 2 was obtained through surface treatment and screening step in the same manner as in Comparative Example 3 except that the heat treatment was not performed. In this case, the amount of the surface treating agent was 38.5 g.

TABLE 1

|  |  |  | Example 1 | Example 2 | Example 3 | Example 4 | Example 5 | Example 6 | Example 7 | Example 8 | Example 9 | Example 10 |
|---|---|---|---|---|---|---|---|---|---|---|---|---|
| Specific surface area | A | (cm$^2$/g) | 17,000 | 15,200 | 19,700 | 21,800 | 24,800 | 13,100 | 15,800 | 17,000 | 18,000 | 22,300 |
| 50% particle diameter | B | (μm) | 2.1 | 2.4 | 1.8 | 1.4 | 0.9 | 2.9 | 2.3 | 2.2 | 2.0 | 1.3 |
| 10% particle diameter | C | (μm) | 0.73 | 0.80 | 0.69 | 0.66 | 0.58 | 0.82 | 0.78 | 0.76 | 0.69 | 0.70 |
| Water content | D1 | (ppm) | 481 | 218 | 439 | 558 | 890 | 302 | 430 | 281 | 933 | 870 |
| Water content | D2 | (ppm) | 19 | 9 | 14 | 58 | 123 | 27 | 6 | 4 | 142 | 111 |
| 90% particle diameter | E | (μm) | 4.4 | 4.7 | 3.9 | 2.6 | 2.1 | 7.9 | 4.6 | 4.8 | 4.4 | 2.7 |
| pH | F |  | 9.5 | 9.3 | 9.4 | 9.5 | 9.6 | 9.4 | 8.6 | 9.8 | 9.4 | 8.6 |
| Residue amount on a sieve | G | (ppm) | 6 | 5 | 3 | 2 | 1 | 8 | 4 | 22 | 5 | 2 |
| Heating apparatus |  |  | ratory kiln | electric furnace | electric furnace | electric furnace | electric furnace | ratory kiln | electric furnace | electric furnace | electric furnace | electric furnace |
| Heating temperature |  | (° C.) | 420 | 400 | 400 | 350 | 400 | 380 | 750 | 750 | 250 | 350 |
| Surface treating agent |  |  | stearic acid | stearic acid | stearic acid | stearic acid | stearic acid | stearic acid | trimethyl phosphate | stearic acid | stearic acid | triethyl phosphate |

TABLE 2

|  |  |  | Comp. Example 1 | Comp. Example 2 | Comp. Example 3 | Comp. Example 4 | Comp. Example 5 | Comp. Example 6 |
|---|---|---|---|---|---|---|---|---|
| Specific surface area | A | (cm$^2$/g) | 18,500 | 14,100 | 27,100 | 17,400 | 9,000 | 28,000 |
| 50% particle diameter | B | (μm) | 2.1 | 3.1 | 1.4 | 2.1 | 9.9 | 1.4 |
| 10% particle diameter | C | (μm) | 0.68 | 0.85 | 0.60 | 0.71 | 1.25 | 0.56 |
| Water content | D1 | (ppm) | 1178 | 894 | 1081 | 1084 | 1110 | 2105 |
| Water content | D2 | (ppm) | 140 | 123 | 90 | 155 | 142 | 390 |
| 90% particle diameter | E | (μm) | 4.4 | 8.3 | 3.1 | 4.5 | 23.1 | 3.1 |

TABLE 2-continued

|  |  |  | Comp. Example 1 | Comp. Example 2 | Comp. Example 3 | Comp. Example 4 | Comp. Example 5 | Comp. Example 6 |
|---|---|---|---|---|---|---|---|---|
| pH | F |  | 9.4 | 9.3 | 9.6 | 8.5 | 9.4 | 9.5 |
| Residue amount on a sieve | G | (ppm) | 5 | 32 | 1 | 3 | 86 | 1 |
| Heating apparatus |  |  | — | — | ratory kiln | — | — | — |
| Heating temperature |  | (° C.) | — | — | 420 | — | — | — |
| Surface treating agent |  |  | stearic acid | fatty acid | stearic acid | trimethyl phosphate | — | stearic acid |

Examples 11 to 18, Comparative Examples 7 to 11

Each surface-treated heavy calcium carbonate obtained in Examples 1 to 6, 8 and 9 and Comparative Examples 1 to 3, 5 and 6 was used, and 50 parts of polyethylene (UMERIT (registered mark) 2040F, manufactured by Ube-Maruzen Polyethylene Co., Ltd.), 50 parts of the surface-treated heavy calcium carbonate, and 1000 ppm of Irganox 1010 (registered mark) as a stabilizer were blended and these components were sufficiently mixed with stirring by a Henschel mixer to disperse these components. Then, the mixture was granulated at 220° C. by using a kneading extruder (LABO PLASTOMILL 2D25W-model, manufactured by Toyo Seiki Seisaku-Sho, Ltd.) to form a pellet. The pellet was dried at 110° C. for 3 hr and then, extruded from a T-die at 230° C. by using a film extruder (LABO PLASTOMILL D2025-model, manufactured by Toyo Seiki Seisaku-Sho, Ltd.) to obtain a non-stretched film. The non-stretched film was heated to 115° C. and stretched at a stretch ratio of 3.3 in a MD direction (extruding direction), and the stretched film was further heated to 120° C. and stretched at a stretch ratio of 3 in a TD direction (lateral direction) in a tenter stretching machine. The basic weight of this film was 15 gsm. The results of evaluation are shown in Table 3. The standard of evaluation is as follows.

<Dispersibility of Particles>

⊙: visually confirmable aggregates and fisheyes caused by coarse particles are not observed in a 300 mm×300 mm film.

○: the number of confirmable aggregates and fisheyes caused by coarse particles is 1 or 2 in a 300 mm×300 mm film.

Δ: the number of confirmable aggregates and fisheyes caused by coarse particles is 3 or more and less than 10 in a 300 mm×300 mm film.

x: the number of confirmable aggregates and fisheyes caused by coarse particles is 10 or more in a 300 mm×300 mm film.

<Gas Mark Caused by Water>

⊙: visually confirmable air cells (gas marks) caused by volatile components such as water are not observed in a 300 mm×300 mm film.

○: the number of confirmable air cells (gas marks) caused by volatile components such as water is 1 or 2 in a 300 mm×300 mm film.

Δ: the number of confirmable air cells (gas marks) caused by volatile components such as water is 3 or more and less than 10 in a 300 mm×300 mm film.

x: the number of confirmable air cells (gas marks) caused by volatile components such as water is 10 or more in a 300 mm×300 mm film.

TABLE 3

| Example or Comp. | Example No. of surface-treated heavy calcium carbonate used | Dispersibility of particles | Gas mark caused by water |
|---|---|---|---|
| Example 11 | Example 1 | ⊙ | ⊙ |
| Example 12 | Example 2 | ⊙ | ⊙ |
| Example 13 | Example 3 | ⊙ | ⊙ |
| Example 14 | Example 4 | ⊙ | ○ |
| Example 15 | Example 5 | ○ | ○ |
| Example 16 | Example 6 | ○ | ⊙ |
| Example 17 | Example 8 | Δ | ○ |
| Example 18 | Example 9 | ○ | Δ |
| Comp. Example 7 | Comp. Example 1 | ⊙ | X |
| Comp. Example 8 | Comp. Example 2 | X | Δ |
| Comp. Example 9 | Comp. Example 3 | ○ | X |
| Comp. Example 10 | Comp. Example 5 | X | X |
| Comp. Example 11 | Comp. Example 6 | Δ | X |

As mentioned above, the surface-treated heavy calcium carbonate according to a first present invention is reduced on cost, has high dispersibility and can provide a film superior in surface characteristics. It is noted that Example 17 has a high pH and is therefore unsuitable for sanitary materials such as paper diapers, body fluid absorbing pads and bed sheets.

Examples 19 to 20, Comparative Examples 12 to 13

Each surface-treated heavy calcium carbonate obtained in Examples 7 and 10 and Comparative Examples 4 and 5 was used. Sufficiently mixed were 60 parts of polyethylene terephthalate (PET) (manufactured by QUADRANT POLYPENCO JAPAN LTD., specific gravity: 1.39) and 40 parts of the surface-treated heavy calcium carbonate with stirring by a Henschel mixer to sufficiently disperse these components. Then, the mixture was granulated at 280° C. by using a kneading extruder (LABO PLASTOMILL 2D25W-model, manufactured by Toyo Seiki Seisaku-Sho, Ltd.) to form a pellet. The pellet was dried at 110° C. for 1 hr, then, extruded in a sheet-like form from a T-die at 290° C. by using a film extruder (LABO PLASTOMILL D2025-model, manufactured by Toyo Seiki Seisaku-Sho, Ltd.), and cooled to solidify in a 30° C. cooling drum to obtain a non-stretched film. The non-stretched film was heated to 95° C. and stretched at a stretch ratio of 3.3 in a MD direction (extruding direction), and the stretched film was further heated to 120° C. and stretched at a stretch ratio of 3 in a TD direction (lateral direction) in a tenter stretching machine to obtain a film 50 μm in thickness. The results of evaluation are shown in Table 4.

<IV (Melt Viscosity) of the Pellet>

The IV (melt viscosity) of a simple PET resin at 280° C. was defined as 100 and indexation of the IV of the obtained pellet was made as an indicator of molecular weight. It is considered that the resin is more hydrolyzed with decrease in the indexed value.

<Dispersibility of Particles>

⊚: visually confirmable aggregates and fisheyes caused by coarse particles are not observed in a 300 mm×300 mm film.

○: the number of confirmable aggregates and fisheyes caused by coarse particles is 1 or 2 in a 300 mm×300 mm film.

Δ: the number of confirmable aggregates and fisheyes caused by coarse particles is 3 or more and less than 10 in a 300 mm×300 mm film.

x: the number of confirmable aggregates and fisheyes caused by coarse particles is 10 or more in a 300 mm×300 mm film.

<Gas Mark Caused by Water>

⊚: visually confirmable air cells (gas marks) caused by volatile components such as water are not observed in a 300 mm×300 mm film.

○: the number of confirmable air cells (gas marks) caused by volatile components such as water is 1 or 2 in a 300 mm×300 mm film.

Δ: the number of confirmable air cells (gas marks) caused by volatile components such as water is 3 or more and less than 10 in a 300 mm×300 mm film.

x: the number of confirmable air cells (gas marks) caused by volatile components such as water is 10 or more in a 300 mm×300 mm film.

Examples 21 and 22, Comparative Examples 14 and 15

Each surface-treated heavy calcium carbonate obtained in Examples 7 and 10 and Comparative Examples 4 and 6 was used. Sufficiently mixed were 70 parts of a bioplastic (TERRAMAC TP-4000 (registered mark), manufactured by UNITIKA LTD, specific gravity: 1.25) and 30 parts of the surface-treated heavy calcium carbonate with stirring by a Henschel mixer to sufficiently disperse these components. Then, the mixture was granulated at 180° C. by using a kneading extruder (LABO PLASTOMILL 2D25W-model, manufactured by Toyo Seiki Seisaku-Sho) to form a pellet. The pellet was dried at 110° C. for 1 hr, then, extruded in a sheet-like form from a T-die at 190° C. by using a film extruder (LABO PLASTOMILL D2025-model, manufactured by Toyo Seiki Seisaku-Sho) to obtain a non-stretched film 100 μm in thickness. The results of evaluation are shown in Table 4.

<IV of the Pellet (Melt Viscosity)>

The IV (melt viscosity) of a simple bioplastic resin at 190° C. was defined as 100 and indexation of the IV of the obtained pellet was made as an indicator of molecular weight. It is considered that the resin is more hydrolyzed with decrease in the indexed value.

<Dispersibility of Particles>

⊚: visually confirmable fisheyes caused by coagulates and coarse particles are not observed in a 100 mm×200 mm film.

○: the number of confirmable fisheyes caused by coagulates and coarse particles is 1 or 2 in a 100 mm×200 mm film.

Δ: the number of confirmable fisheyes caused by coagulates and coarse particles is 3 or more and less than 10 in a 100 mm×200 mm film.

x: the number of confirmable fisheyes caused by coagulates and coarse particles is 10 or more in a 100 mm×200 mm film.

<Gas Mark Caused by Water>

⊚: visually confirmable holes (gas marks) caused by volatile components such as water are not observed in a 100 mm×200 mm film.

○: the number of confirmable holes (gas marks) caused by volatile components such as water is 1 or 2 in a 100 mm×200 mm film.

Δ: the number of confirmable holes (gas marks) caused by volatile components such as water is 3 or more and less than 10 in a 100 mm×200 mm film.

x: the number of confirmable holes (gas marks) caused by volatile components such as water is 10 or more in a 100 mm×200 mm film.

TABLE 4

| | Example or Comp. Example No. of surface-treated heavy calcium carbonate used | IV index of pellets | Dispersibility of particles | Gas mark caused by water |
|---|---|---|---|---|
| Example 19 | Example 7 | 103 | ⊚ | ⊚ |
| Example 20 | Example 10 | 105 | ⊚ | ○ |
| Comp. Example 12 | Comp. Example 4 | 89 | ○ | X |
| Comp. Example 13 | Comp. Example 5 | 98 | X | Δ |
| Example 21 | Example 7 | 106 | ⊚ | ⊚ |
| Example 22 | Example 10 | 107 | ○ | ⊚ |
| Comp. Example 14 | Comp. Example 4 | 95 | ○ | X |
| Comp. Example 15 | Comp. Example 6 | 82 | Δ | X |

As mentioned above, the surface-treated heavy calcium carbonate according to a first present invention has low water content and therefore can stably provide a film reduced in fisheyes and gas marks even if the resin is a polyester resin which is easily reduced in molecular weight by hydrolysis.

Next, the present invention will be explained in more detail by way of examples according to a second present invention and comparative examples, which are, however, not intended to be limiting of the present invention. In the following explanations, the designation "part(s)" indicates "part(s) by weight".

Example 1

Commercially available heavy calcium carbonate (Super S, manufactured by MARUO CALCIUM CO., LTD.) was used and heat-treated using an external heating type rotary kiln (manufactured by Takasago International Corporation, external dimension Ø: 150×2000 mm) in the following conditions: external heating temperature: 62° C., number of rotations of the retort: 4 rpm, angle: 60 mm, and feed rate: 6 kg/h. At this time, the product temperature was 490° C. and the retention time was about 10 min. This particle product was allowed to cool. Then, a mesh with 75 μm opening was fitted to a HI-BOLTA 300-model (manufactured by TOYO HITEC CO., LTD.; non-liner) and coarse particles and coagulated particles were eliminated from the particle product by the mesh to obtain heavy calcium carbonate having powder properties shown in Table 1A.

Example 2

Heat treatment was performed in the same manner as in Example 1 except that commercially available heavy calcium carbonate (Super SS, manufactured by MARUO CALCIUM CO., LTD.) was used. The product was allowed to cool and surface-treated using a Super Mixer (SMV-20, manufactured by Kawata MFG Co., Ltd.). Poured was 6 kg of the product into a mixer and heated. After the product temperature reached 70° C., 48 g of tallow fatty acid ester was added with stirring and further heated with stirring until the product temperature reached 130° C. Then, the resulting product was treated through a screening step in the same manner as in Example 1 to obtain surface-treated heavy calcium carbonate having powder properties shown in Table 1A.

Example 3

Commercially available heavy calcium carbonate (Super SSS, manufactured by MARUO CALCIUM CO., LTD.) was used and heat-treated at 400° C. for 1 hr in an electric furnace. The product was treated through a screening step in the same manner as in Example 1 to obtain heavy calcium carbonate having powder properties shown in Table 1A.

Example 4

Commercially available heavy calcium carbonate (Super SSS, manufactured by MARUO CALCIUM CO., LTD.) was heat-treated in the same manner as in Example 3 and surface-treated in the same manner as in Example 2. The product was treated through a screening step in the same manner as in Example 1 to obtain surface-treated heavy calcium carbonate having powder properties shown in Table 1A. In this case, the surface treating agent was stearic acid and was poured into the reaction system after melted at 70° C. The amount of the surface treating agent was 36 g.

Example 5

Surface-treated heavy calcium carbonate having powder properties shown in Table 1A was obtained through heat treatment, surface treatment, and screening step in the same manner as in Example 4 except that commercially available heavy calcium carbonate (Super #1700, manufactured by MARUO CALCIUM CO., LTD.) was used. In this case, the surface treating agent was butyl stearate and its amount was 60 g.

Example 6

Surface-treated heavy calcium carbonate having powder properties shown in Table 1A was obtained through heat treatment, surface treatment, and screening step in the same manner as in Example 4 except that commercially available heavy calcium carbonate (Super #2000, manufactured by MARUO CALCIUM CO., LTD.) was used. In this case, the amount of stearic acid which was the surface treating agent was 60 g.

Example 7

Surface-treated heavy calcium carbonate having powder properties shown in Table 1A was obtained through surface treating and screening step in the same manner as in Example 6 except that the condition of the electric furnace was altered to temperature of 250° C. and heat treating time of 1 hr.

Example 8

Commercially available heavy calcium carbonate (Caltex 5, manufactured by MARUO CALCIUM CO., LTD.) was classified using a fluid classifier (Turboclassifier TC-15) in the following conditions: feed rate: 1.0 kg/h, number of rotations of a rotor: 1.2000 rpm, air flow rate: 1.5 m$^3$/min, to recover the coarse powder part. This coarse powder part was heat-treated at 400° C. for 1 hr in an electric furnace. The resulting product was treated through surface treatment and screening step in the same manner as in Example 6 to obtain surface-treated heavy calcium carbonate having powder properties shown in Table 1A. In this case, the amount of stearic acid which was the surface treating agent was 82.5 g.

Comparative Example 1

Commercially available heavy calcium carbonate (N-35, manufactured by MARUO CALCIUM CO., LTD.).

Comparative Example 2

Commercially available heavy calcium carbonate (Super S, manufactured by MARUO CALCIUM CO., LTD.).

Comparative Example 3

Commercially available surface-treated heavy calcium carbonate (MC Coat S-13, manufactured by MARUO CALCIUM CO., LTD.).

Comparative Example 4

Commercially available surface-treated heavy calcium carbonate (MC Coat S-20, manufactured by MARUO CALCIUM CO., LTD.).

Comparative Example 5

Surface-treated heavy calcium carbonate having powder properties shown in Table 1A by surface treating through a screening step in the same manner as in Example 8 except that the classification was not performed.

TABLE 1A

| | | | Example 1 | Example 2 | Example 3 | Example 4 | Example 5 | Example 6 | Example 7 | Example 8 |
|---|---|---|---|---|---|---|---|---|---|---|
| Specific surface area | A | (cm$^2$/g) | 8,800 | 9,800 | 12,500 | 10,900 | 16,500 | 17,000 | 18,000 | 24,800 |
| 50% particle diameter | B | (μm) | 9.9 | 5 | 4.2 | 4.2 | 2.4 | 2.1 | 2.0 | 0.9 |

TABLE 1A-continued

| Water content | C1 | (ppm) | 543 | 466 | 910 | 275 | 780 | 481 | 933 | 890 |
|---|---|---|---|---|---|---|---|---|---|---|
| Water content | C2 | (ppm) | 33 | 46 | 49 | 11 | 18 | 19 | 142 | 95 |
| Surface treating agent | | | none | tallow fatty acid ester | none | stearic acid | butyl stearate | stearic acid | stearic acid | stearic acid |

| | | | Comp. Example 1 | Comp. Example 2 | Comp. Example 3 | Comp. Example 4 | Comp. Example 5 |
|---|---|---|---|---|---|---|---|
| Specific surface area | A | $(cm^2/g)$ | 3,900 | 9,000 | 11,600 | 18,500 | 28,200 |
| 50% particle diameter | B | (μm) | 22.4 | 9.9 | 4.2 | 2.1 | 0.8 |
| Water content | C1 | (ppm) | 534 | 1110 | 1220 | 1345 | 1211 |
| Water content | C2 | (ppm) | 97 | 124 | 110 | 140 | 108 |
| Surface treating agent | | | none | none | fatty acid | fatty acid | fatty acid |

Examples 9 to 16, Comparative Examples 6 to 10

Each heavy calcium carbonate obtained in Examples 1 to 8 and Comparative Examples 1 to 5 was used and each synthetic resin composition was produced in the following manner to conduct a storage stability test. The test results are shown in Table 2A.

In this case, the heavy calcium carbonate was not pre-dried though silica was pre-dried at 11.0° C. for 3 hr in an oven.

(Polyurethane One-Component Adhesive)
L-1036:540 parts, manufactured by Mitsui Takeda Chemicals Inc., (polyurethane resin)
Mineral spirit: 60 parts (solvent)
Aerosil 200: 2.4 parts, manufactured by Degussa Japan Co., Ltd., (silica)
Heavy calcium carbonate: 400 parts <Storage Stability Test>
The above formulation ingredients were mixed with stirring by using a Dalton universal mixing and stirring machine (manufactured by Dalton Co., Ltd.: 2 L) to obtain a synthetic resin composition. This composition was filled in a cartridge and its viscosity (2 rpm: V1 and 20 rpm: V2) and TI value ($TI_{23}$ value: V1/V2) were measured just after it was left at 23° C. for one day. Then, its viscosity (2 rpm: V3 and 20 rpm: V4) and TI value ($TI_{70}$ value: V3/V4) were measured just after it was left at 70° C. for one day, and further, the rate of change in viscosity (2 rpm: V3/V1×100, 20 rpm: V4/V2×100) was measured to evaluate storage stability.

<Appearance of a Coating>
Also, a synthetic resin composition prepared by mixing the above formulation gradients with stirring was taken and spread into a thin film 1 mm in thickness on a straight plate to rate the appearance of the film visually according to the following criteria.

◯: the coating surface is uniform and no aggregate is observed.

Δ: though the coating surface is uniform, several aggregates are confirmed.

x: the coating surface is not uniform and many aggregates are confirmed.

<Sedimentation Test>
A synthetic resin composition prepared by mixing the above formulation gradients with stirring was poured into a transparent mayonnaise jar and allowed to stand at 70° C. for 7 days in a constant temperature and humidity testing chamber. Then, the resin composition was visually observed to rate according to the following criteria.

◯: no precipitate is observed at all or slight precipitates are observed on the bottom of the jar.

Δ: though a thin deposit is observed on the bottom of the jar, the composition can be used without any problem.

x: a hard cake is formed on the bottom of the jar.

TABLE 2A

| | Example or Comp. Example No. of surface-treated calcium carbonate used | Viscosity after at 23° C. for one day | | | Viscosity after at 70° C. for one day | | | Rate of change in viscosity | | Appearance of coating | Sedimentation test |
|---|---|---|---|---|---|---|---|---|---|---|---|
| | | 2 rpm (Pa·s) V1 | 20 rpm (Pa·s) V2 | $TI_{23}$ value V1/V2 | 2 rpm (Pa·s) V3 | 20 rpm (Pa·s) V4 | $TI_{70}$ value V3/V4 | 2 rpm (%) V3/V1 × 100 | 20 rpm (%) V4/V2 × 100 | | |
| Example 9 | Example 1 | 31 | 17 | 1.82 | 43 | 24 | 1.79 | 139 | 141 | ◯ | Δ |
| Example 10 | Example 2 | 40 | 25 | 1.60 | 52 | 33 | 1.58 | 130 | 132 | ◯ | Δ |
| Example 11 | Example 3 | 39 | 21 | 1.86 | 60 | 36 | 1.67 | 154 | 171 | ◯ | ◯ |
| Example 12 | Example 4 | 53 | 20 | 2.65 | 75 | 32 | 2.34 | 142 | 160 | ◯ | ◯ |
| Example 13 | Example 5 | 54 | 22 | 2.45 | 84 | 35 | 2.40 | 156 | 159 | ◯ | ◯ |
| Example 14 | Example 6 | 98 | 28 | 3.50 | 147 | 45 | 3.27 | 150 | 161 | ◯ | ◯ |
| Example 15 | Example 7 | 122 | 46 | 2.65 | 211 | 88 | 2.40 | 173 | 191 | Δ | ◯ |
| Example 16 | Example 8 | 132 | 41 | 3.22 | 244 | 91 | 2.68 | 185 | 222 | Δ | ◯ |
| Comp. Example 6 | Comp. Example 1 | 29 | 17 | 1.71 | 51 | 28 | 1.82 | 176 | 165 | ◯ | X |
| Comp. Example 7 | Comp. Example 2 | 33 | 18 | 1.83 | 121 | 81 | 1.49 | 367 | 450 | ◯ | Δ |
| Comp. Example 8 | Comp. Example 3 | 62 | 29 | 2.14 | 195 | 115 | 1.70 | 315 | 397 | Δ | ◯ |

TABLE 2A-continued

| Example or Comp. Example No. of surface-treated calcium carbonate used | | Viscosity after at 23° C. for one day | | | Viscosity after at 70° C. for one day | | | Rate of change in viscosity | | Appearance of coating | Sedimentation test |
|---|---|---|---|---|---|---|---|---|---|---|---|
| | | 2 rpm (Pa·s) V1 | 20 rpm (Pa·s) V2 | TI$_{23}$ value V1/V2 | 2 rpm (Pa·s) V3 | 20 rpm (Pa·s) V4 | TI$_{70}$ value V3/V4 | 2 rpm (%) V3/V1 × 100 | 20 rpm (%) V4/V2 × 100 | | |
| Comp. Example 9 | Comp. Example 4 | 84 | 26 | 3.23 | 806 | 277 | 2.91 | 960 | 1065 | X | ◯ |
| Comp. Example 10 | Comp. Example 5 | 132 | 36 | 3.67 | 2,350 | 655 | 3.59 | 1780 | 1819 | X | ◯ |

As mentioned above, the heavy calcium carbonate according to the second aspect of the present invention has high storage stability even if the preliminary drying step is omitted and therefore can provide an adhesive maintaining thixotropy.

Examples 17 to 24, Comparative Examples 11 to 15

Each heavy calcium carbonate obtained in Examples 1 to 8 and Comparative Examples 1 to 5 was used and each synthetic resin composition was produced in the following manner to conduct a storage stability test. The test results are shown in Table 3A.

In this case, the heavy calcium carbonate was not pre-dried though silica was pre-dried at 110° C. for 3 hr in an oven.

(Modified Silicone One-Component Sealant)
MS polymer 203: 540 parts, manufactured by Kaneka Corporation (modified silicone resin)
DINP: 30 parts, manufactured by J-PLUS Co., Ltd. (solvent)
Aerosil 200: 8 parts, manufactured by Degussa Japan Co., Ltd., (silica)
KBM1003: 3 parts, manufactured by Shin-Etsu Chemical Co., Ltd. (dehydrating agent)
NEOSTAN U-220H: 1 part, manufactured by NITTO KASEI CO., LTD. (tin catalyst)
KBM-603: 1 part, manufactured by Shin-Etsu Chemical Co., Ltd. (adhesive promoter)
Heavy calcium carbonate: 100 parts <Storage Stability Test>
The above formulation ingredients were mixed with stirring by using a Dalton universal mixing and stirring machine (manufactured by Dalton Co., Ltd.: 2 L) to obtain a synthetic resin composition. This composition was filled in a cartridge and its viscosity (1 rpm: V1 and 10 rpm: V2) and TI value (TI$_{23}$ value: V1/V2) were measured just after it was left at 23° C. for one day. Then, its viscosity (1 rpm: V3 and 10 rpm: V4) and TI value (TI$_{50}$ value: V3/V4) were measured just after it was left at 50° C. for 7 days and further, the rate of change in viscosity (1 rpm: V3/V1×100, 10 rpm: V4/V2× 100) was measured to evaluate storage stability.

<Dispersibility Test>
Also, a synthetic resin composition prepared by mixing the above formulation gradients with stirring was taken and spread so as to form a thin film having a length of 5 cm or more, a width of 5 cm or more, and a thickness of 1 mm or less on a glass plate by a spatula. The appearance of the film was visually rated according to the following criteria.

◯: any aggregate having a size of 0.5 mm or more is not observed on a 5-cm square coating surface.

Δ: 1 or 2 aggregates having a size of 0.5 mm or more are observed on a 5-cm square coating surface.

x: 3 or more aggregates having a size of 0.5 mm or more are observed on a 5 cm square coating surface.

TABLE 3A

| | Example or Comp. Example No of surface treated calcium carbonate used | Viscosity after at 23° C. for one day | | | Viscosity after at 50° C. for 7 days | | | Rate of change in viscosity | | Dispersibility |
|---|---|---|---|---|---|---|---|---|---|---|
| | | 1 rpm (pa·s) V1 | 10 rpm (Pa·s) V2 | TI$_{23}$ value V1/V2 | 1 rpm (Pa·s) V3 | 10 rpm (Pa·s) V4 | TI$_{50}$ value V3/V4 | 1 rpm (%) V3/V1 × 100 | 10 rpm (%) V4/V2 × 100 | |
| Example 17 | Example 1 | 2240 | 325 | 6.89 | 2680 | 401 | 6.68 | 120 | 123 | ◯ |
| Example 18 | Example 2 | 2390 | 350 | 6.83 | 2730 | 406 | 6.72 | 114 | 116 | ◯ |
| Example 19 | Example 3 | 2350 | 338 | 6.95 | 2810 | 422 | 6.66 | 120 | 125 | ◯ |
| Example 20 | Example 4 | 2410 | 345 | 6.99 | 2730 | 410 | 6.66 | 113 | 119 | ◯ |
| Example 21 | Example 5 | 2860 | 403 | 7.10 | 3120 | 470 | 6.64 | 109 | 117 | ◯ |
| Example 22 | Example 6 | 2760 | 392 | 7.04 | 3220 | 478 | 6.74 | 117 | 122 | ◯ |
| Example 23 | Example 7 | 2810 | 403 | 6.97 | 3330 | 505 | 6.59 | 119 | 125 | Δ |
| Example 24 | Example 8 | 3040 | 424 | 7.17 | 3590 | 531 | 6.76 | 118 | 125 | Δ |
| Comp. Example 11 | Comp. Example 1 | 1570 | 240 | 6.54 | 2090 | 356 | 5.87 | 133 | 148 | ◯ |
| Comp. Example 12 | comp. Example 2 | 2290 | 333 | 6.88 | 3210 | 515 | 6.23 | 140 | 155 | ◯ |
| Comp. Example 13 | Comp. Example 3 | 2390 | 345 | 6.93 | 3290 | 517 | 6.36 | 138 | 150 | ◯ |

TABLE 3A-continued

| Example or Comp. Example No of surface treated calcium carbonate used | Viscosity after at 23° C. for one day | | | Viscosity after at 50° C. for 7 days | | | Rate of change in viscosity | | Dispersibility |
|---|---|---|---|---|---|---|---|---|---|
| | 1 rpm (pa · s) V1 | 10 rpm (Pa · s) V2 | TI$_{23}$ value V1/V2 | 1 rpm (Pa · s) V3 | 10 rpm (Pa · s) V4 | TI$_{50}$ value V3/V4 | 1 rpm (%) V3/V1 × 100 | 10 rpm (%) V4/V2 × 100 | |
| Comp. Example 14 | Comp. Example 4 | 2910 | 423 | 6.88 | 3830 | 672 | 5.70 | 132 | 159 | Δ |
| Comp. Example 15 | Comp. Example 5 | 3140 | 444 | 7.07 | 4420 | 745 | 5.93 | 141 | 168 | X |

As mentioned above, the heavy calcium carbonate according to a second present invention can provide a sealant superior in storage stability even if the preliminary drying step is omitted.

INDUSTRIAL APPLICABILITY

As mentioned above, the surface-treated heavy calcium carbonate according to a first present invention can be produced in a dry system and therefore has advantages on cost. There is therefore provided surface-treated heavy calcium carbonate which is suitable for the production of a porous film exactly controlled in its pore diameter and can be sufficiently dehydrated either without any pre-drying treatment or by simple pre-drying treatment because it exhibits excellent dispersibility and low-water characteristic as a filler when it is compounded in, for example, a film forming resin.

Also, the surface-treated heavy calcium carbonate according to a first present invention has low water characteristic and is therefore suitable for easily hydrolyzable polyester resins such as bioplastics, PET and PEN, and also for resins called engineering plastics such as nylon and polycarbonate which have so high glass transition temperature that they must be kneaded at a high temperature, showing its excellently large usability.

The heavy calcium carbonate according to a second present invention can be produced in a dry system and therefore has advantages on cost. There is therefore provided surface-treated heavy calcium carbonate which can be sufficiently dehydrated either withouts any pre-drying treatment or by simple pre-drying treatment when it is compounded in a curable resin such as a one-component type moisture curable adhesive or sealant.

Also, the heavy calcium carbonate according to a second present invention has low water characteristic and is therefore suitable for bioplastics, easily hydrolyzable polyester resins such as PET and PEN and also for resins called engineering plastics such as nylon and polycarbonate which have so high glass transition temperature that they must be kneaded at a high temperature, showing its excellently large usability.

The invention claimed is:

1. A surface-treated heavy calcium carbonate made by treating a heavy calcium carbonate with a surface treatment agent, and satisfying the following formulae (1) to (4):

$$13,100 \leq A \leq 24,800 \quad (1)$$

$$0.8 \leq B \leq 3.0 \quad (2)$$

$$C \geq 0.55 \quad (3)$$

$$0 \leq D1 \leq 1000 \quad (4)$$

wherein:
A: specific surface area measured by an air permeability method (cm$^2$/g),
B: average particle diameter (μm): 50% particle diameter of a particle measured by a laser particle size distribution analyzer (d50),
C: 10% particle diameter in a particle size distribution measured by a laser particle size distribution analyzer (μm), and
D1: water content measured at a temperature between 25° C. and 300° C. by a Karl-Fischer method (heating vaporization method) (ppm).

2. The surface-treated heavy calcium carbonate according to claim 1, further satisfying the following formulae (5) and (6):

$$E \leq 8 \quad (5)$$

$$0 \leq D2 \leq 150 \quad (6)$$

wherein:
E: 90% particle diameter in a particle size distribution measured by a laser particle size distribution analyzer (μm), and
D2: water content measured at a temperature between 200° C. and 300° C. by a Karl-Fischer method (heating vaporization method) (ppm).

3. The surface-treated heavy calcium carbonate according to claim 1, further satisfying the following formula (7):

$$8.0 \leq F \leq 9.8 \quad (7)$$

wherein:
F: pH of an aqueous 10 wt % suspension of the surface-treated heavy calcium carbonate.

4. The surface-treated heavy calcium carbonate according to claim 1, wherein the surface treating agent is at least one selected from the group consisting of a fatty acid, its derivative and a phosphoric ester.

5. A method for producing the surface-treated heavy calcium carbonate according to claim 1, which comprises the step of:
classifying heavy calcium carbonate, then
heat-treating the heavy calcium carbonate at 300° C. or more to 800° C. or less by a heating apparatus selected from a kiln, an electric furnace and a microwave furnace, and
surface-treating the heavy calcium carbonate by using a surface treating agent.

6. A method for producing the surface-treated heavy calcium carbonate according to claim 1, which comprises the steps of:
heat-treating heavy calcium carbonate at 300° C. or more to 800° C. or less by a heating apparatus selected from a kiln, an electric furnace and a microwave furnace, then classifying the heavy calcium carbonate, and
surface-treating the heavy calcium carbonate with a surface treating agent.

7. A resin composition containing the surface-treated heavy calcium carbonate according to claim 1.

8. The resin composition according to claim 7, wherein the resin is a thermoplastic resin.

9. The resin composition according to claim 8, wherein the thermoplastic resin is a polyolefin resin or a polyester resin.

10. The resin composition according to claim 9, wherein the resin composition is used for films.

11. A heavy calcium carbonate satisfying the following formulae (1) to (4):

$$8,800 \leq A \leq 24,800 \quad (1)$$

$$0.8 \leq B \leq 15 \quad (2)$$

$$0 \leq C1 \leq 1000 \quad (3)$$

$$0 \leq C2 \leq 150 \quad (4)$$

wherein:
A: specific surface area measured by an air permeability method (cm$^2$/g),
B: average particle diameter (μm): 50% particle diameter of a particle measured by a laser particle size distribution analyzer (d50),
C1: water content measured at a temperature between 25° C. and 300° C. by a Karl-Fischer method (heating vaporization method) (ppm), and
C2: water content measured at a temperature between 200° C. and 300° C. by a Karl-Fischer method (heating vaporization method) (ppm).

12. The heavy calcium carbonate according to claim 11, which is surface-treated by at least one surface treating agent selected from the group consisting of a fatty acid and its derivative.

13. A method for producing the heavy calcium carbonate according to claim 11, which comprises heat-treating heavy calcium carbonate at 300° C. or more to 800° C. or less by a heating apparatus selected from a kiln, an electric furnace and a microwave furnace.

14. A method for producing heavy calcium carbonate according to claim 12, which comprises surface-treating the heavy calcium carbonate after heat treatment at 300° C. or more to 800° C. or less by a heating apparatus selected from a kiln, an electric furnace and a microwave furnace.

15. A resin composition comprising a resin and the heavy calcium carbonate according to claim 11.

16. The resin composition according to claim 15, wherein the resin is a curable resin.

17. The resin composition according to claim 16, wherein the curable resin is for use in a one-component adhesive or a one-component sealant.

* * * * *